United States Patent
Ikegami

(10) Patent No.: US 6,461,073 B1
(45) Date of Patent: Oct. 8, 2002

(54) BOLT FASTENING STRUCTURE FOR RESIN MEMBER

(75) Inventor: Yasuyuki Ikegami, Shizuoka (JP)

(73) Assignee: Fuji Kiko Co., Ltd., Kosai (JP)

( * ) Notice: Subject to any disclaimer, the term of this patent is extended or adjusted under 35 U.S.C. 154(b) by 0 days.

(21) Appl. No.: 09/572,733

(22) Filed: May 17, 2000

(30) Foreign Application Priority Data

May 18, 1999 (JP) ............................................ 11-136513

(51) Int. Cl.[7] .............................................. B60K 20/00
(52) U.S. Cl. ................. 403/375; 403/408.1; 74/473.18; 74/473.12
(58) Field of Search .............................. 403/408.1, 375, 403/24, 344, 373; 74/473.18, 473.12, 473.1, 473.36, 473.15

(56) References Cited

U.S. PATENT DOCUMENTS

| | | | | |
|---|---|---|---|---|
| 4,998,446 A | * | 3/1991 | Towne et al. ............. | 74/473.15 |
| 5,144,852 A | * | 9/1992 | Yokoyama ............... | 74/473.36 |
| 5,490,434 A | * | 2/1996 | Osborn et al. ............. | 74/473.1 |
| 6,003,399 A | * | 12/1999 | Netzker et al. .......... | 74/473.36 |
| 6,089,723 A | * | 7/2000 | Ogasawara et al. .. | 403/408.1 X |

FOREIGN PATENT DOCUMENTS

| | | |
|---|---|---|
| JP | 2501348 | 3/1996 |
| JP | 2527871 | 12/1996 |
| JP | 2724540 | 12/1997 |

* cited by examiner

Primary Examiner—Lynne H. Browne
Assistant Examiner—John R. Cottingham
(74) Attorney, Agent, or Firm—Foley & Lardner

(57) ABSTRACT

A bolt fastening structure is comprised of a fastened member and a fastening seat. The fastened member has a bolt hole for inserting a bolt and a pair of slits disposed around the bolt hole. The fastening seat has a pair of leg portions and a connecting portion integrally connecting the leg portions. The leg portions have a length which is substantially as same as a depth dimension of the bolt hole of said fastened member. The leg portions are inserted to the slits, respectively. By fastening the bolt with a threaded hole of a second fastened member, upper and lower surfaces of the leg portions are fitted to a head of the bolt and the second fastened member.

19 Claims, 10 Drawing Sheets

FIG.13A
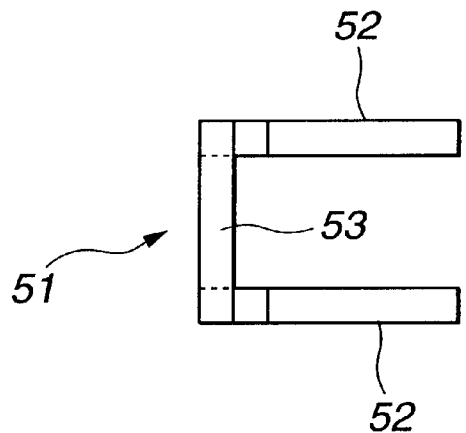
FIG.13B
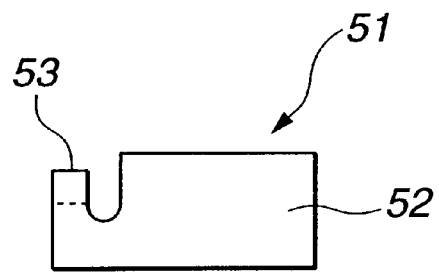
FIG.13C
FIG.13D
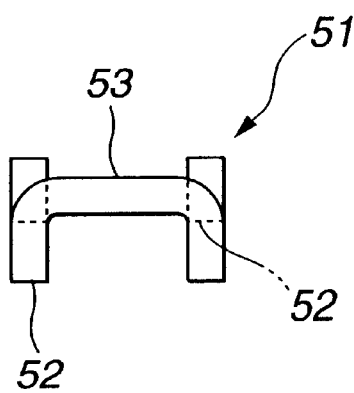
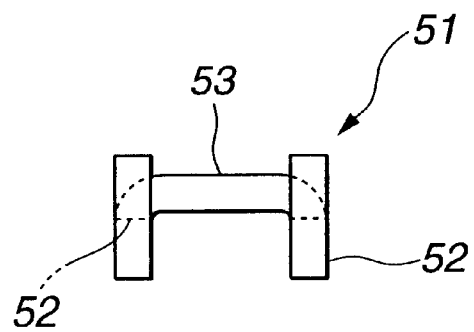

BOLT FASTENING STRUCTURE FOR RESIN MEMBER

BACKGROUND OF THE INVENTION

The present invention relates to improvements in a bolt fastening structure applied to fastening between a housing of a shift lever apparatus and a shift cable bracket and fastening between the housing and a vehicle body.

Many shift lever apparatuses have employed a housing made of plastic resin. Usually, a shift lever apparatus is interconnected to a cable bracket for connecting a shift cable to the shift lever apparatus, by means of bolts. However, it is not preferable that a resin member is directly fastened with another member by means of bolts due to properties of plastic resin. For example, due to mechanical property of resin members a fastening force of the resin member to other member is restricted so as to avoid the resin member from being broken. Further, it is necessary to take account of loosening of fastened bolts due to thermal deformation of resin members. In order to prevent the above-mentioned problems, various products including resin members employ collars in a bolt fastening structure.

SUMMARY OF THE INVENTION

However, since a conventional shift lever apparatus employing collars is connected to a cable bracket with a resin housing by means of two bolts, it is necessary to insert two collars to the bolts, respectively. Accordingly, this arrangement complicates an assembly process of the shift lever apparatus. Further, due to a cylindrical shape of the collars, there is a limitation of lowering a production cost of such collars. Furthermore, it is necessary to provide various sizes of collars in order to adapt to various sizes of bolts.

It is therefore an:object of the present invention to provide an improved fastening structure which enables stable and rigid fastening between a resin member and a metal member by means of a bolt while enabling the decrease of the production cost thereof.

An aspect of the present invention resides in a fastening structure using a bolt which structure comprises a fastened member and a fastening seat inserted to the fastened member. The fastened member has a bolt hole for inserting the bolt and a pair of slits disposed around the bolt hole. The fastening seat has a pair of leg portions and a connecting portion integrally connecting the leg portions. The leg portions have a length which is substantially as same as a depth dimension of the bolt hole of the fastened member. The leg portions being inserted to the slits, respectively.

Another aspect of the present invention resides in a fastening structure using a bolt comprising: a fastening seat having a pair of leg portions and a connecting portion integrally connecting the leg portions, the leg portions perpendicularly extending from the connecting portions; and a fastened member having a bolt hole and a seat receiving hollow having a hollow shape corresponding to that of said fastening seat, the seat receiving hollow being fitted with the fastening seat.

BRIEF DESCRIPTION OF THE DRAWINGS

FIG. 13A is a plan view showing the fastening seat employed in the second embodiment.

FIG. 13B is a front view showing the fastening seat of FIG. 13A.

FIG. 13C is a side view showing the fastening seat of FIG. 13A.

FIG. 13D is another side view showing the fastening seat of FIG. 13A.

DETAILED DESCRIPTION OF THE INVENTION

Referring to FIGS. 1 to 9, there is shown a first embodiment of a bolt fastening structure according to the present invention.

Figure 1:
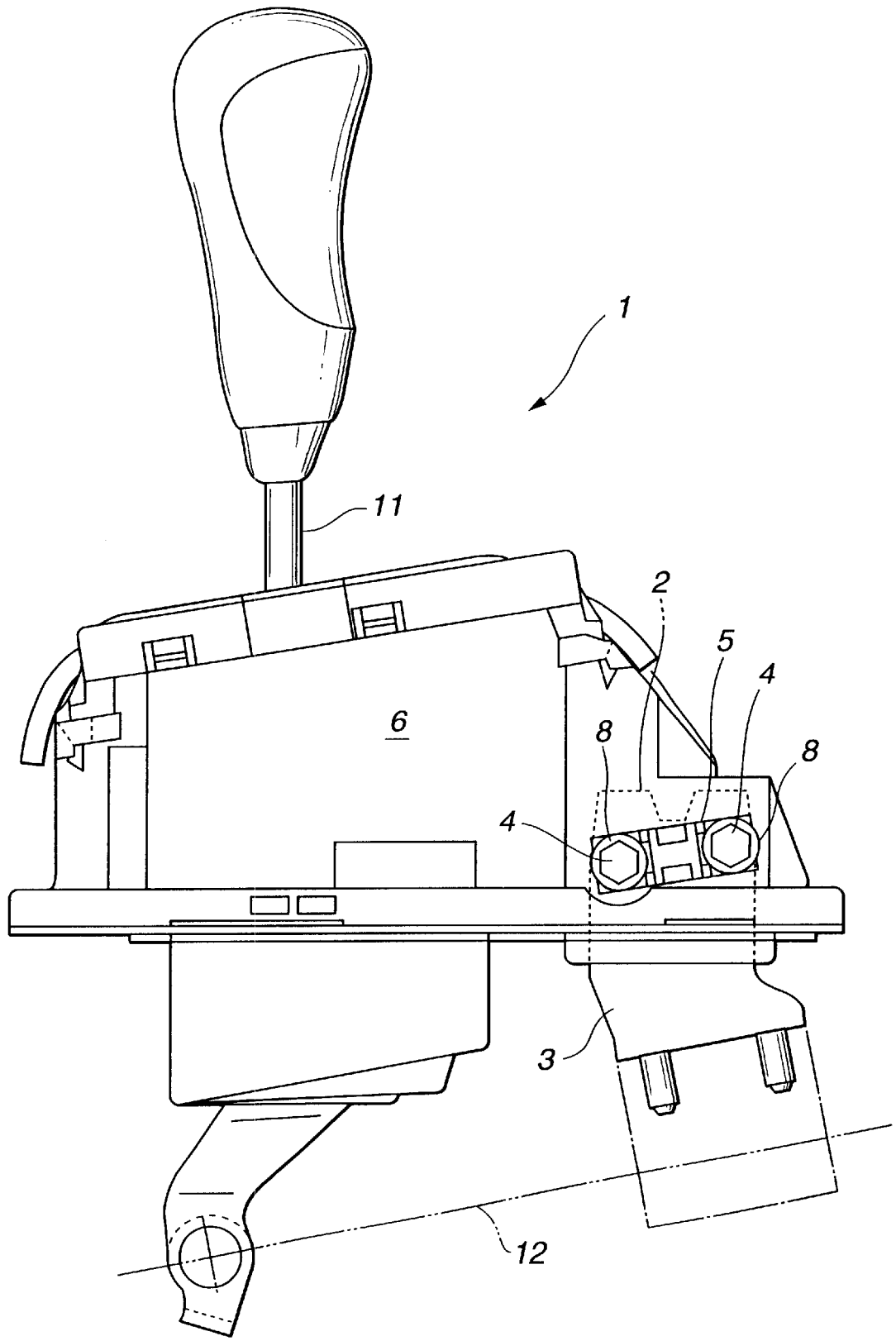
FIG. 1 is a side view showing a shift lever apparatus employing a fastening structure according to the present invention.

As shown in FIG. 1, a shift lever apparatus 1 comprises a housing 6 made of plastic resin and a shift lever 11 swingably supported to the housing 6. The housing 6 has a bracket installation portion 2 to which a cable bracket 3 is fixed by means of a pair of bolts 4. The cable bracket 3 is made of metal plate and supports a shift cable 12 through an outer cover 12a of the shift cable 12. The cable bracket 3 has two threaded holes 3a to which the bolts 4 are screwed. An end of the shift cable 12 is connected to a lower-end of the shift lever 11, and the other end of the shift cable 12 is connected to an automatic transmission (not shown).

The bolts 4 are screwed through a fastening seat 5 and washers 8 and 9 to the threaded holes 3a, respectively, to fixedly connect the bracket installation portion 2 of the housing 6 and the cable bracket 3. An outer surface of the bracket installation portion 2 is a plate-like surface. It will be understood that washer faced bolts may be employed instead of the bolts 4 and the washers 8 and 9.

Figure 2:
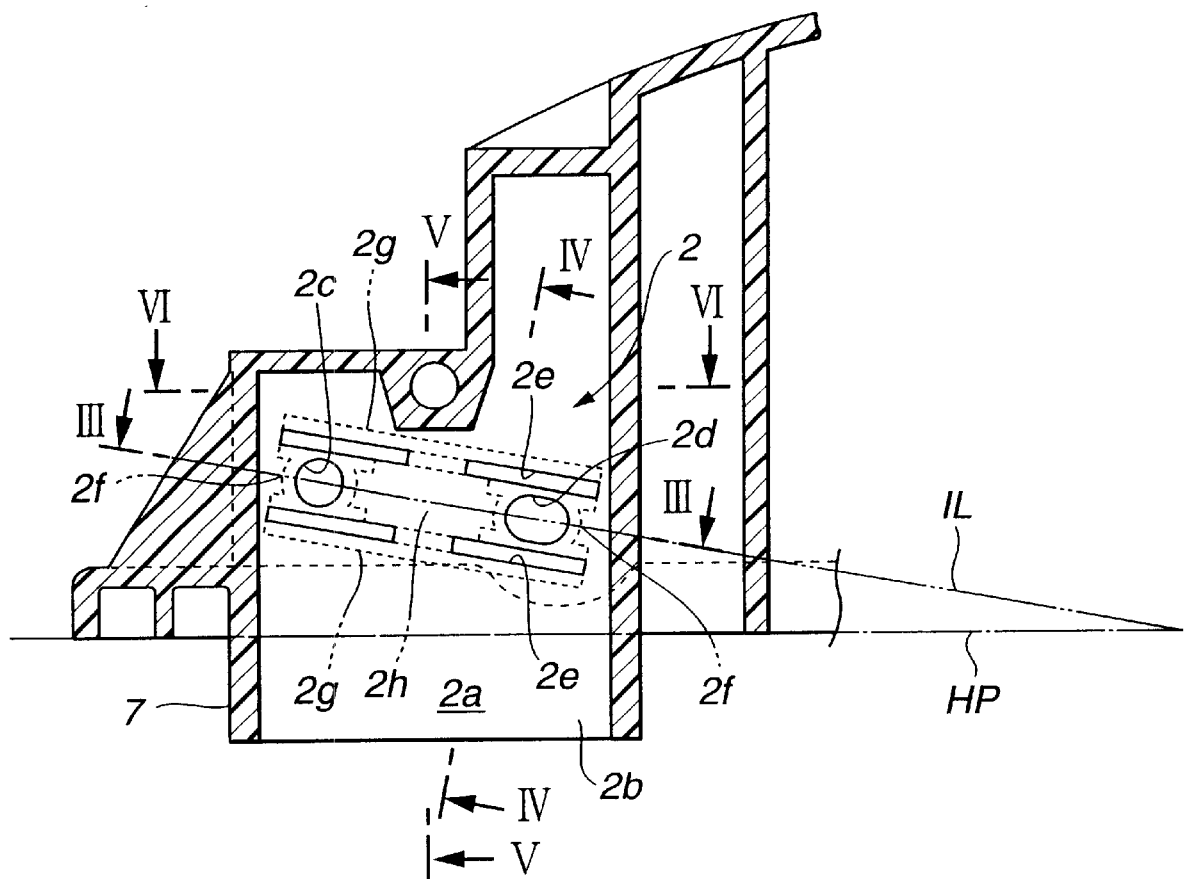
FIG. 2 is a cross-sectional view showing an essential part of a bracket installation portion of the fastening structure of a first embodiment according to the present invention.
Figure 3:
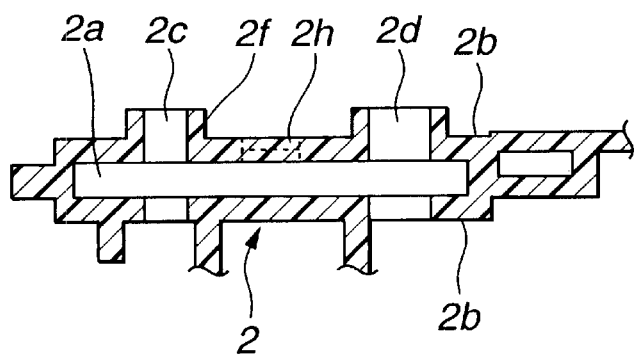
FIG. 3 is a cross-sectional view taken in the direction of allows substantially along the lines III—III of FIG. 2.
Figure 4:
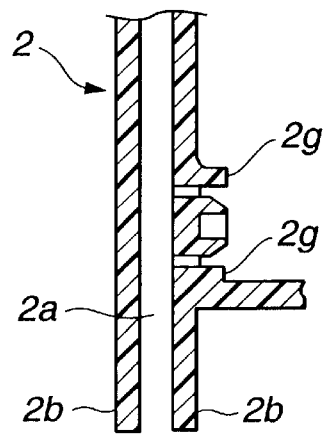
FIG. 4 is a cross-sectional view taken in the direction of allows substantially along the lines IV—IV of FIG. 2.
Figure 5:
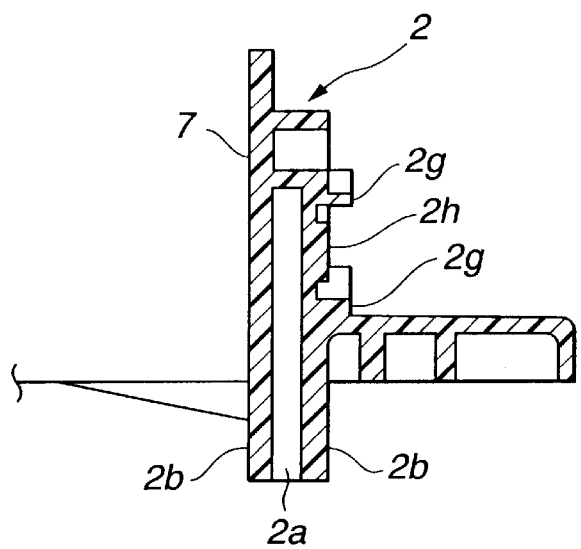
FIG. 5 is a cross-sectional view taken in the direction of allows substantially along the lines V—V of FIG. 2.
Figure 6:
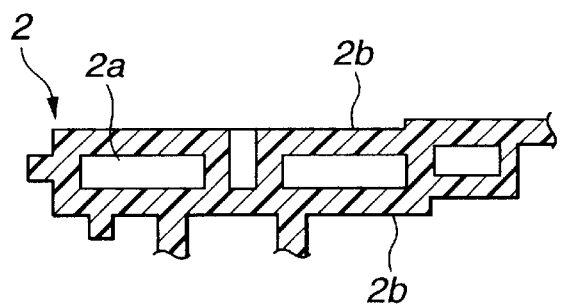
FIG. 6 is a cross-sectional view taken in the direction of allows substantially along the lines VI—VI of FIG. 2.

The bracket installation portion 2 has a chamber 2a, a circular hole 2c, a slotted hole 2d and two pairs of slits 2e. The chamber 2a is defined by opposite two walls 2b and receives the cable bracket 3 therein. The circular hole 2c and the slotted hole 2d are aligned on an imaginary line IL which is slightly inclined from a horizontal plane HP as shown FIG. 2. The two pairs of the slits 2e are formed in one of the walls 2b in parallel so as to locate the two holes 2c and 2d therebetween, as shown in FIG. 2. More specifically, the slits 2e of each pair are arranged in parallel, and these two pairs are aligned side by side while inclining with respect to the imaginary horizontal plane HP, as shown in FIG. 2.

Figure 8:
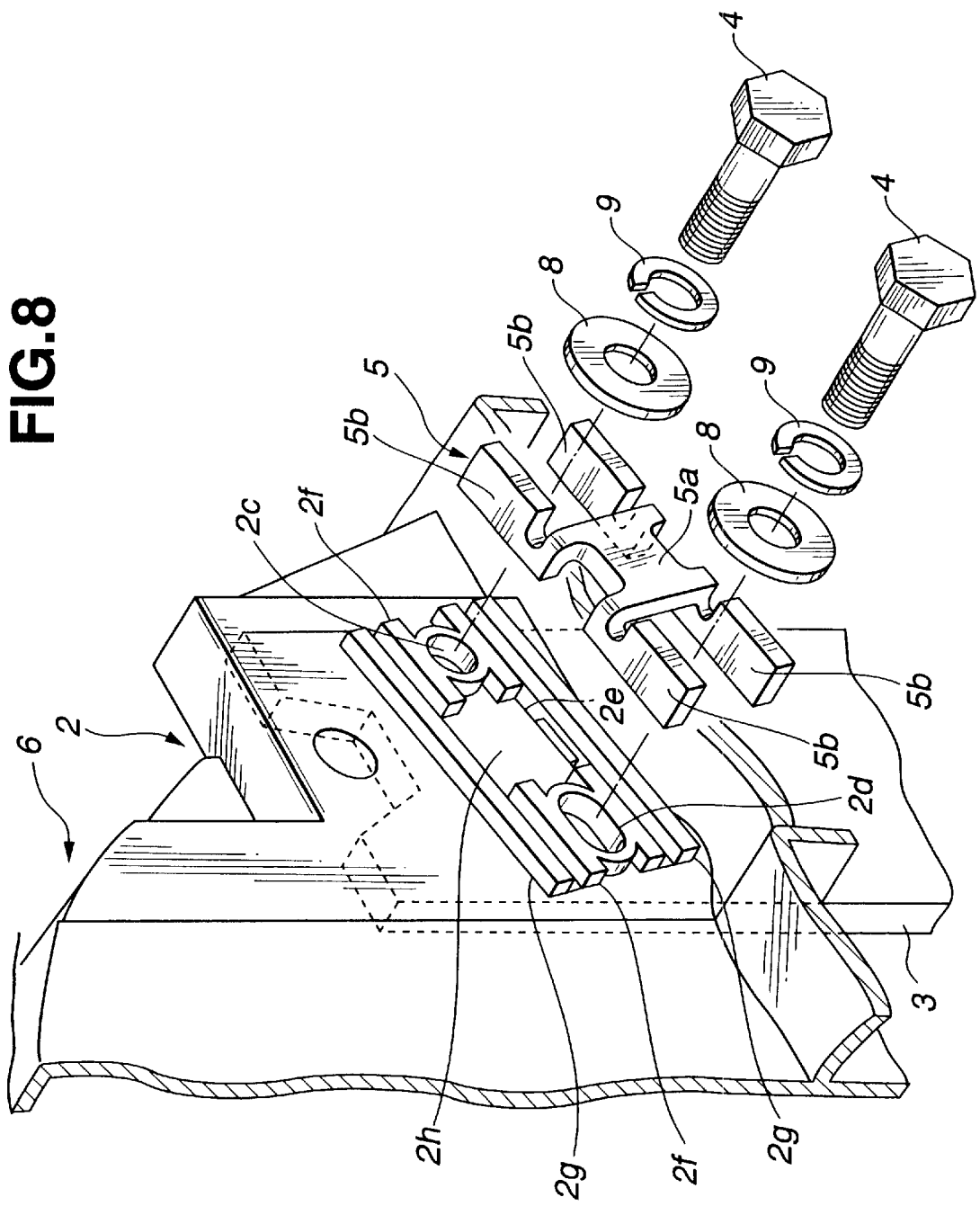
FIG. 8 is an exploded perspective view showing the bolt fastening structure of the first embodiment.
Figure 9:
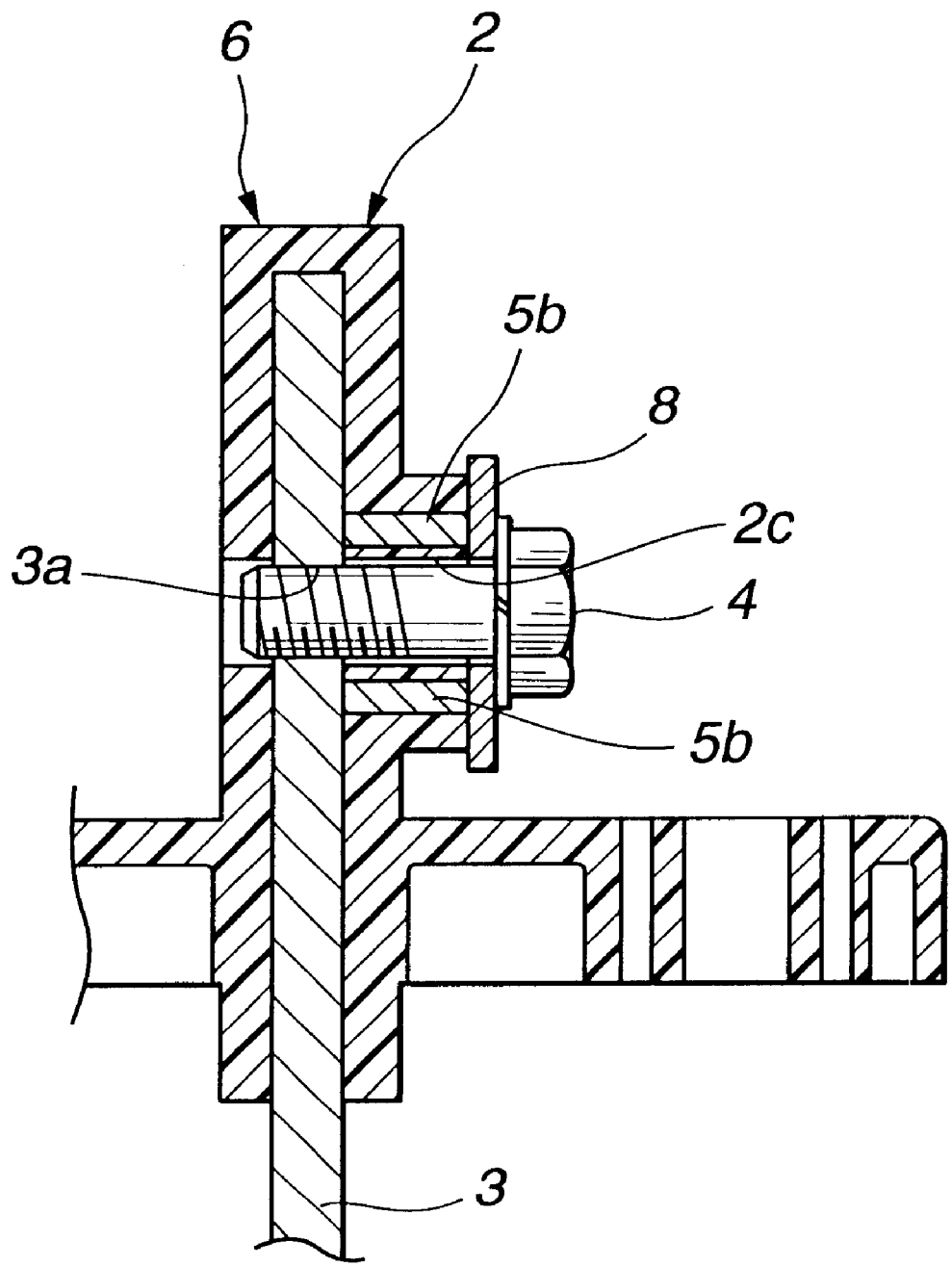
FIG. 9 is a cross-sectional view showing the fastened state of the bolt fastening structure of FIG. 8.

Thick portions 2f are protrudingly formed around the holes 2c and 2d of the one of the walls 2b, as shown in FIG. 8. Each of the thick portions 2f is constituted by a cylindrical portion and a parallel two bars which are continuous with each other as is clearly shown in FIG. 8. Top surfaces of the thick portions 2f protrude from a surface of the wall 2b. A pair of straight thick portions 2g are formed in parallel with each other so as to locate the holes 2c and 2d therebetween as shown in FIG. 8. The straight thick portions 2g also protrude from the surface of the wall 2b, and the height level of top surfaces of the straight thick portions 2g generally corresponds to that of the top surfaces of the thick portions 2f. That is, the top surfaces of the straight thick portions 2g and the top surfaces of the thick portions 2f are set to be generally in a plane.

Two washers 8 are fittingly installed on the straight thick portions 29 when the bolts 4 are installed to the holes 2c and 2d. The thick portions 2f and 2g are provided in order to ensure a depth dimension of the holes 2c and 2d and to decrease unstableness of the fastening seat 5 thereon by increasing a contact surface between inner wall portions of the slits 2e and the fastening seat 5. If the depth dimension of the slits 2e is greater than a predetermined dimension without these thick portions 2f and 2g, it is not necessary to form these thick portions 2f and 2g.

Figure 7A:
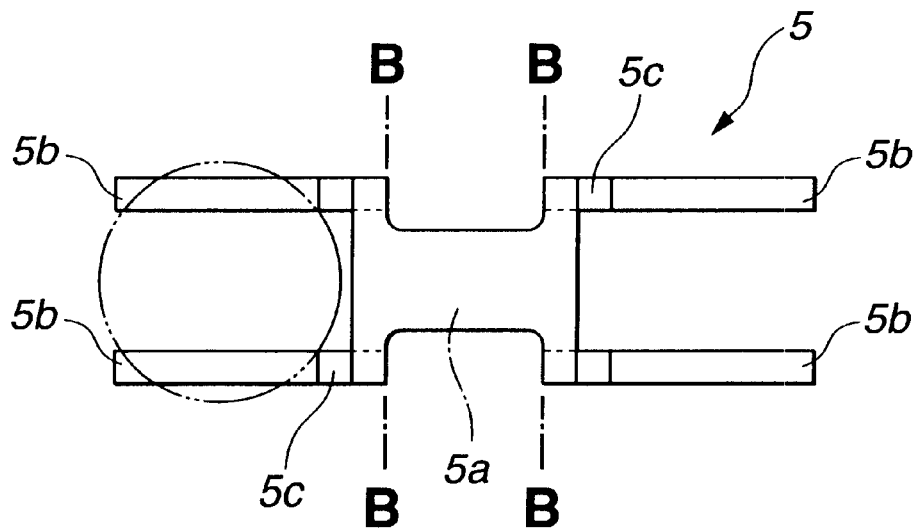
FIG. 7A is a plan view of a fastening seat employed in the fastening structure of the first embodiment according to the present invention.
Figure 7B:
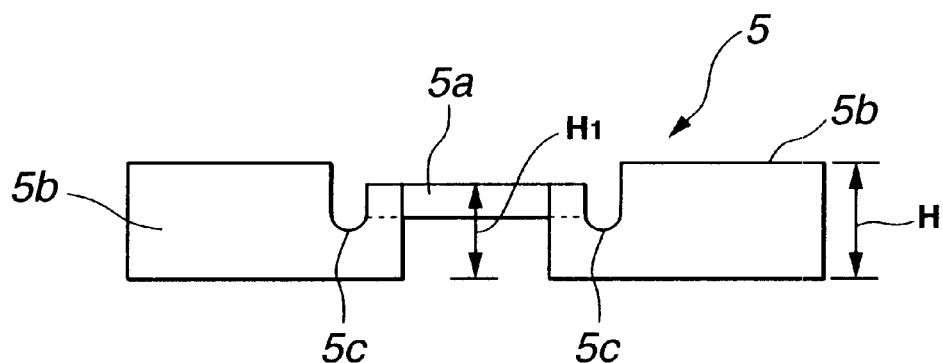
FIG. 7B is a front view of the fastening seat of FIG. 7A.

The fastening seat 5 comprises two pairs of leg portions 5b and a connecting portion 5a integrally connecting the two pairs of the leg portions 5b. The connecting portion 5a is formed into an H-shaped plate as shown in FIG. 7A. The leg portions 5b are in the form of a rectangular plate, respectively and are connected to four end portions of the H-shaped connecting portion 5a. The two pairs of the leg portions 5b are arranged so that each pair of the leg portions 5b are aligned parallel. Each leg portion 5b has a U-shaped cutout portion 5c in the vicinity of the connecting portion 5a, as shown in FIG. 7B. The height dimension H of the leg portions 5b is set generally equal to the sum of the thickness of the wall 2b and the height dimension of the thick portions 2f, and the height dimension $H_1$ of the connecting portion 5 is set to be smaller than the height dimension H of the leg portion 5b as shown in FIG. 7B.

Figure 7C:
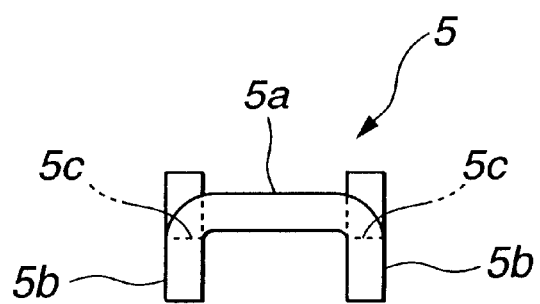
FIG. 7C is a side view of the fastening seat of FIG. 7A.

As shown in FIGS. 7A to 8, the fastening seat 5 is inserted to the slits 2e so that opposing inner surfaces of each pair of the opposing leg portions 5b are press-fittingly in contact with opposing inner surfaces of the opposing slits 2e of each pair. End surfaces of the leg portions 5b inserted to the slits 2e are in contact with a surface of the cable bracket 3. The other end surfaces of the leg portions 5b, which are located at a side connected to the connecting portion 5a, are leveled at a height generally the same as that of the thick portions 2f and 2g. The bolts 4 are inserted to the circular hole 2c and the slotted hole 2d, respectively, through the washers 8 and spring washers 9 and are screwed to the threaded holes 3a of the cable bracket 3, respectively. By this screw connection between the bolts 5 and the threaded holes 3a, the housing 6 and the cable bracket 3 are fixedly fastened with each other.

The fastening force of the bolts 4 is applied to the cable bracket 3 through the fastening seat 5, and therefore even if the housing 6 made of plastic resin is repeatedly deformed by thermal change, the bolts 4 are never loosened from the fixedly fastened state. Therefore, the cable bracket 3 is fixedly connected to the housing 6 without generating looseness therebetween.

When the holes 2c and 2d are located adjacently with each other as mentioned in this embodiment, it becomes possible to made the fastening seat 5 into one piece as mentioned in this embodiment. This enables the number of parts to be decreased.

Since the fastening seat 5 is formed by bending a blanked flat metal plate, it is easily machined by means of press forming. This decreases the production cost of the product employing this fastening seat 5. Further, since the leg portions 5b of the fastening seat 5 are formed in parallel, it is possible to adapt the fastening seat 5 to a case having different holes in diameter. This promotes common use of the fastening seat 5 to various bolts.

Furthermore, since the pair of slits 2e are formed in the housing 6 so as to locate the holes 2c and 2d for bolts 4 therebetween, it is possible to increase the connecting portion of the peripheral portions of the holes 2c and 2d to other portions of the housing 6. This functions to increase a structural strength. Additionally, the connecting portion 5a for connecting the two pairs of the leg portions 5b is installed on a depressed portion 2h while pressing this depressed portion 2h and is formed large in size. Therefore, it is possible to ensure the supporting strength between the housing 6 and the cable bracket 3.

Referring to FIGS. 10 to 13D, there is shown a second embodiment of the fastening structure according to the present invention. The second embodiment discloses a fastening structure of the housing 6 to a vehicle body.

Figure 10:
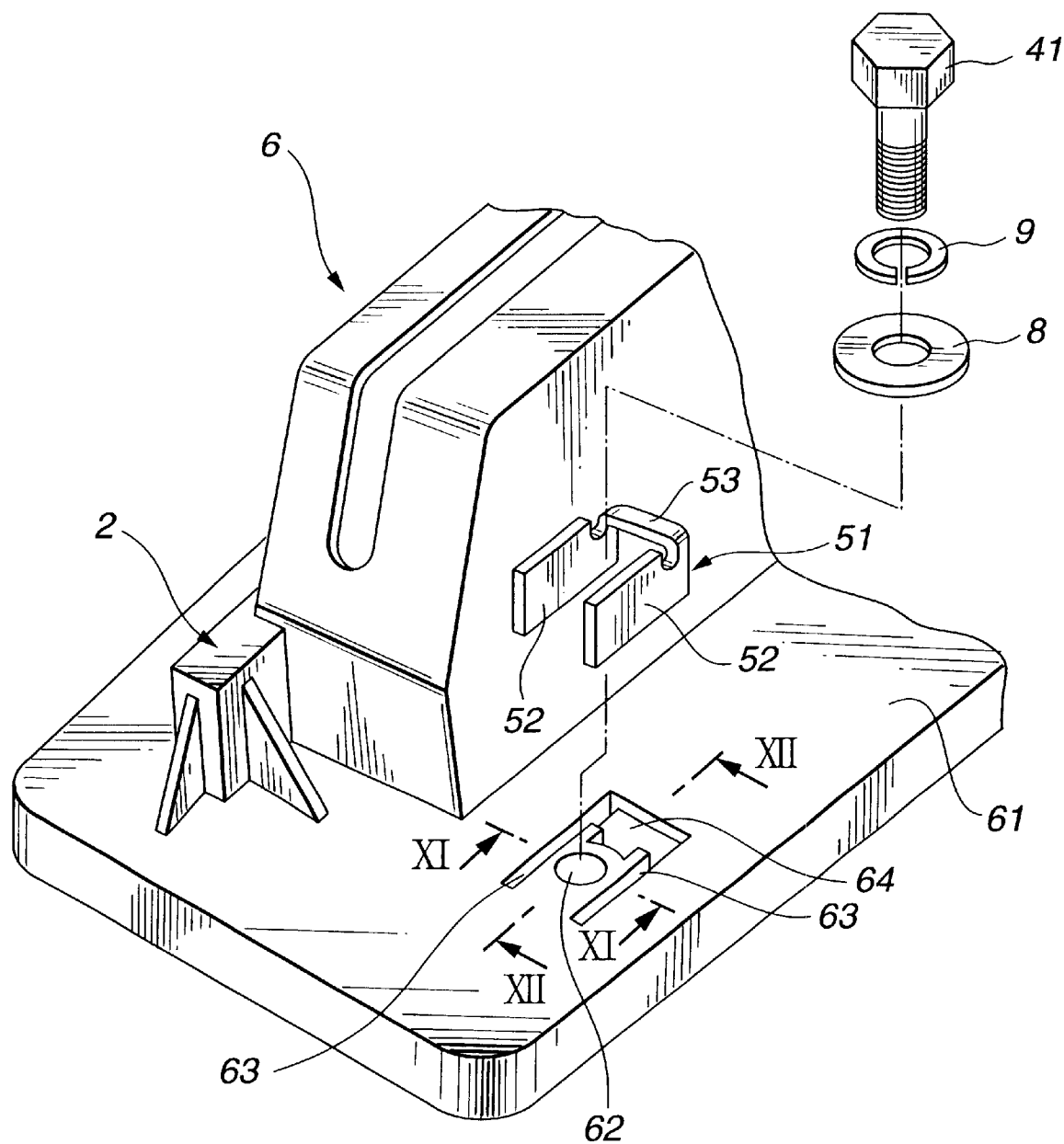
FIG. 10 is an exploded perspective view showing a second embodiment of the bolt fastening structure applied to the fastening of a housing to a vehicle body in accordance with the present invention.
Figure 11:
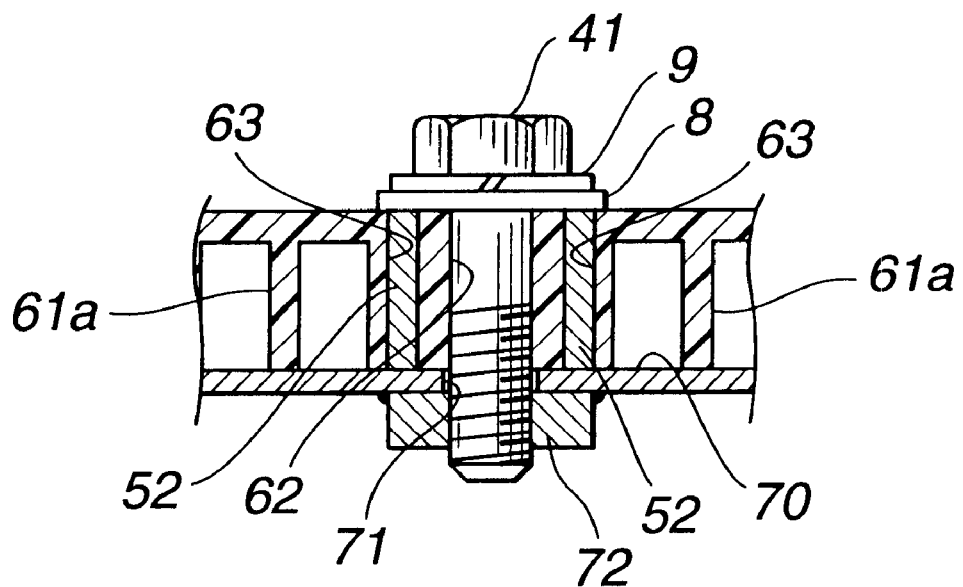
FIG. 11 is a cross-sectional view taken in the direction of arrows substantially along the line XI—XI of FIG. 10.

As shown in FIG. 10, the housing 6 for the shift selector lever comprises a flat installation portion 61 fixed to the vehicle body. The flat installation portion 61 has four fastening holes 62 at corner portions near four corners thereof. A reinforcement flange 61a is formed around each of the fastening holes (bolt holes) 62 at a lower surface of the flat installation portion 61 as shown in FIG. 11. The reinforcement flange 61a is formed into a rectangular (grid) shape as viewed from a bolt installation direction. Each bolt 41 is inserted to each fastening hole 62 through a washer 8 and a spring washer 9 and screwed to a nut 72 fixed to a supporting portion 70 of the vehicle body. The supporting portion 70 has four holes 71 corresponding to the fastening holes 62, and the four nuts 62 are fixed around the holes 71 so as to be screwed with the bolts 41, respectively. By this screw connection between the bolts 4 and nuts 71, the housing 6 is fixedly fastened to the vehicle body.

Figure 12:
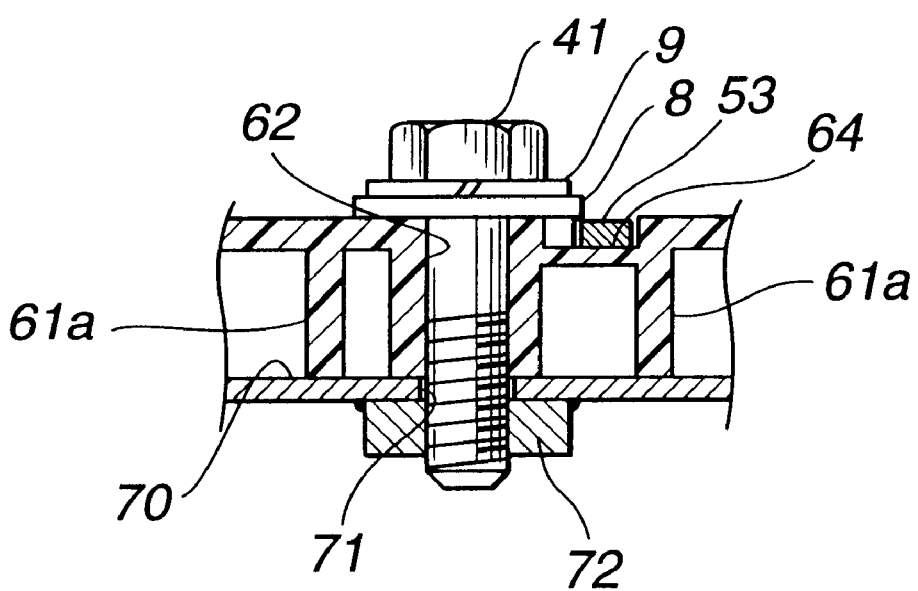
FIG. 12 is a cross-sectional view taken in the direction of arrows substantially along the line XII—XII of FIG. 10.

As is clearly shown in FIG. 10, a pair of slits 63 are formed in the installation portion 61 so as to locate each fastening hole 62 therebetween while being in parallel. The fastening holes 62 and the slits 63 are formed to have a depth dimension as same as that of the flange 61a. A depressed portion 64 is formed at a portion near the fastening hole 62 as shown in FIG. 12.

A fastening seat 51 is formed into a channel-shape in a plan view and has a pair of leg portions 52 and a connecting portion 53 through which the leg portions 52 are integrally connected. The leg portions 52 are inserted to the slits 63, respectively. The height dimension H of the leg portions 52 is set generally equal to the depth dimension of the slit 63 and the fastening hole 62. The depressed portion 64 is formed on the installation portion 61 so as to be lower in height level than the upper surface of the installation portion 61 by a thickness of the connecting portion 53. The connecting portion 53 is engagedly fitted to the depressed portion 61.

Since the fastening force of each bolt 41 is applied to the vehicle body installation plate 61 through each fastening seat 51 and even if the housing 6 made of plastic resin is repeatedly deformed by thermal change, each bolt 41 is never loosened from the fixedly fastened state. Therefore, the housing 6 is fixedly connected to the vehicle body installation plate 61 without generating looseness therebetween.

Since the leg portions 52 of the fastening seat 5 are formed in parallel, it is possible to adapt the fastening seat 5 to a case having different holes in diameter. This promotes common use of the fastening seat as a common part.

Furthermore, since the pair of slits 63 are formed in the installation portion 61 so as to locate the fastening hole 62 therebetween, it is possible to increase the connecting portion of the peripheral portions of the hole 62 to other portions of the housing 6. This functions to increase a structural strength. Additionally, the connecting portion 53 for connecting the two pairs of the leg portions 52 is installed on the depressed portion 64 while pressing this depressed portion 64 and is formed large in size. Therefore, it is possible to ensure the supporting strength between the housing 6 and the vehicle body.

Figure 14A:
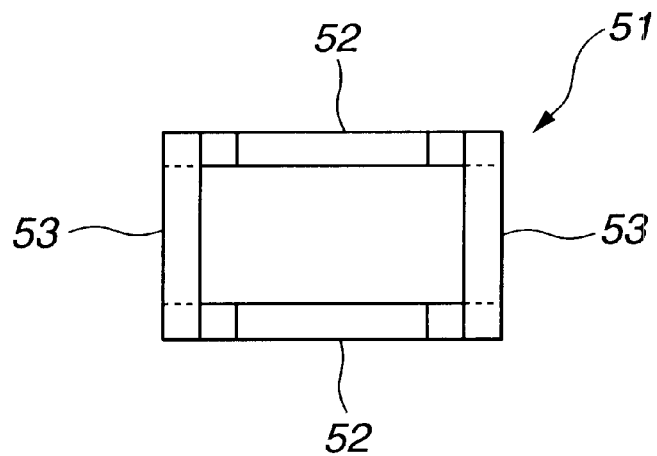
FIG. 14A is a plan view showing a modification of the fastening seat employed in the second embodiment.
Figure 14B:
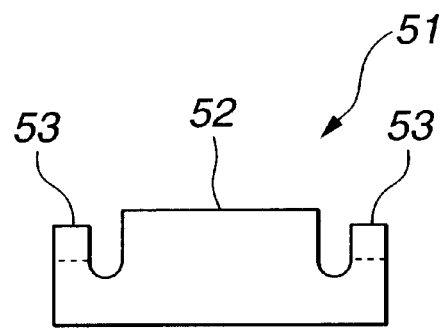
FIG. 14B is a front view showing the fastening seat of FIG. 14A.
Figure 14C:
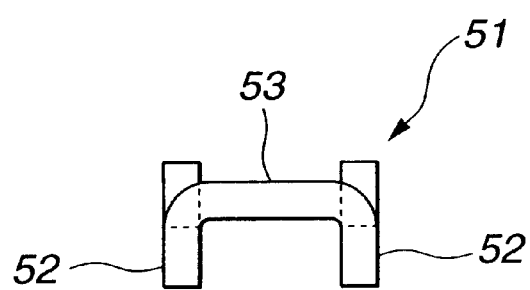
FIG. 14C is a side view showing the fastening seat of FIG. 14A.

FIGS. 14A to 14C show a modification of the second embodiment according to the present invention.

The modified fastening seat 51a comprises a pair of leg portions 52 and a pair of connecting portions 53 which connects both end portions of one of the leg portions 52 to both end portions of the other, as shown in FIG. 14A.

Since the connecting portions 53 are engaged with a pair of depressed portions 64 arranged at both sides of the fastening hole 62 so as to press the depressed portions 64, it is possible to increase an area for pressing the housing 6. This functions to increase a structural strength between the housing 6 and the vehicle body. It will be understood that this modified fastening seat 51a is preferably applied to a bolt fastening structure where each bolt is located apart.

The contents of Application No. H11-136513 with a filing date May 19, 1999 in Japan are hereby incorporated by reference.

Although the invention has been described above by reference to certain embodiments of the invention, the invention is not limited to the embodiment described above. Modifications and variations of the embodiments described above will occur to those skilled in the art in the light of the above teachings. The scope of the invention is defined with reference to the following claims.

What is claimed is:

1. A fastening structure using a bolt, said fastening structure comprising:
a fastened member having a bolt hole for inserting the bolt and a pair of slits disposed around the bolt hole;
a fastening seat having a pair of leg portions and a connecting portion integrally connecting the leg portions, the leg portions having a length which is substantially equal to a depth dimension of the bolt hole of said fastened member, the leg portions being inserted to the slits, respectively; and
a second fastened member fastened with said fastened member, said second fastened member having a threaded hole into which the bolt is screwed so that a head of the bolt is in contact with upper surfaces of the leg portions and a surface of said second fastened member is in contact with lower surfaces of the leg portions.

2. The fastening structure as claimed in claim 1, wherein the connecting portion of said fastening seat has an upper surface which is lower in height level than an upper surface of the leg portion of said fastening seat, said fastened member having a depressed portion which receives the connecting portion when said fastening seat is fitted to said fastened member.

3. The fastening structure as claimed in claim 1, wherein said fastening seat includes two pairs of the leg portions and the connecting portion integrally connecting the two pairs of the leg portions, the connecting portion being formed into a H-shape plate, the leg portions being connected to four end portions of the H-shaped connecting portion, the two pairs of the leg portions being arranged so that each pair of the leg portions are aligned in parallel.

4. The fastening structure as claimed in claim 1, wherein said fastening seat includes a pair of the leg portions and two connecting portions, the two connecting portions connecting both corners of one of the leg portions with both corners of the other of the leg portions.

5. The fastening structure as claimed in claim 1, wherein the leg portion has a U-shaped cutout portion in the vicinity of the connecting portion.

6. The fastening structure as claimed in claim 1, wherein said fastened member includes a flat portion to which the bolt hole and the slits are disposed.

7. The fastening structure as claimed in claim 1, wherein said fastened member is made of resin and the second fastened member is made of metal.

8. The fastening structure as claimed in claim 1, wherein said fastened member has a thick portions formed around the bolt hole.

9. The fastening structure as claimed in claim 1, wherein said fastened member includes a reinforcement flange of a grid shape which extends from a lower surface of said fastened member toward a lower side.

10. The fastening structure as claimed in claim 1, wherein said fastened member has a pair of thick portions which are disposed around the bolt hole so as to locate the bolt hole therebetween.

11. The fastening structure as claimed in claim 1, wherein said fastening seat is made of metal.

12. The fastening structure as claimed in claim 1, wherein said fastened member includes a housing of a shift lever apparatus and the second fastened member includes a cable bracket.

13. The fastening structure as claimed in claim 1, wherein said fastened member includes a housing of a shift lever apparatus and the second fastened member includes a vehicle body.

14. The fastening structure as claimed in claim 1, wherein the bolt hole of said fastened member includes a circular hole and a slotted hole which are located adjacently.

15. A fastening structure using a bolt, said fastening structure comprising:
a fastening seat having a pair of leg portions and a connecting portion integrally connecting the leg portions, the leg portions perpendicularly extending from the connecting portions; and
a fastened member having a bolt hole and a seat receiving hollow having a hollow shape generally corresponding to a shape of said fastening seat, the seat receiving hollow being fitted with said fastening seat, the seat receiving hollow including a pair of slits and a depressed portion to which the leg portions and the connecting portion of said fastening seat, are fittingly installed, respectively.

16. The fastening structure as claimed in claim 13, wherein a seat receiving portion includes a pair of slits and a depressed portion to which the leg portions and the connection portion of said fastening seat are fitting installed, respectively.

17. The fastening structure as claimed in claim 16, wherein the bolt hole is located between the pair of slits which are parallel.

18. A fastening structure comprising:

a resin member having a bolt hole, a pair of slits and a depressed portion;

a connected member made of metal having a threaded hole;

a fastening seat having a pair of leg portions and a connecting portion integrally connecting the leg portions, said fastening seat being fittingly inserting the leg portions to the slits and by setting the connecting portion on the depressed portion; and a bolt having a head and a threaded portion, said bolt being inserted to the bolt hole and being fastened to the threaded hole of the connected member so that the leg portions are in contact with the head of the bolt and a surface of the connected member.

19. A fastening structure using a bolt, said fastening structure comprising:

a fastened member having a bolt hole for a bolt and a pair of straight slits disposed around the bolt hole, the bolt hole being located between the pair of slits; and a fastening seat having a pair of leg portions and a connecting portion integrally connecting the leg portions, the leg portions having a length which is substantially equal to a depth dimension of the bolt hole of said fastened member, the leg portions being inserted into the slits, respectively.

* * * * *